Nov. 14, 1950     C. A. LAASE     2,530,066
KNURLING BROACH

Filed Nov. 10, 1947     3 Sheets-Sheet 3

INVENTOR·
Charles A. Laase,
By Carr & Carr & Gravely,
HIS ATTORNEYS.

Patented Nov. 14, 1950

2,530,066

UNITED STATES PATENT OFFICE 2,530,066

KNURLING BROACH

Charles A. Laase, Genoa, Ohio, assignor to The Timken Roller Bearing Company, Canton, Ohio, a corporation of Ohio Application November 10, 1947, Serial No. 784,971

4 Claims. (Cl. 90—33)

This invention relates to internal broaching mechanisms and in its more specific aspects is directed to a broaching device to knurl the inside surface of tubular members and in particular certain types of roller bearing cups.

The object of this invention is to provide a reversibly operated broaching mechanism in which right and left hand rotation may be imposed on the cutter in order to knurl the inside surface of tubular or other similarly shaped objects.

Figure 1:
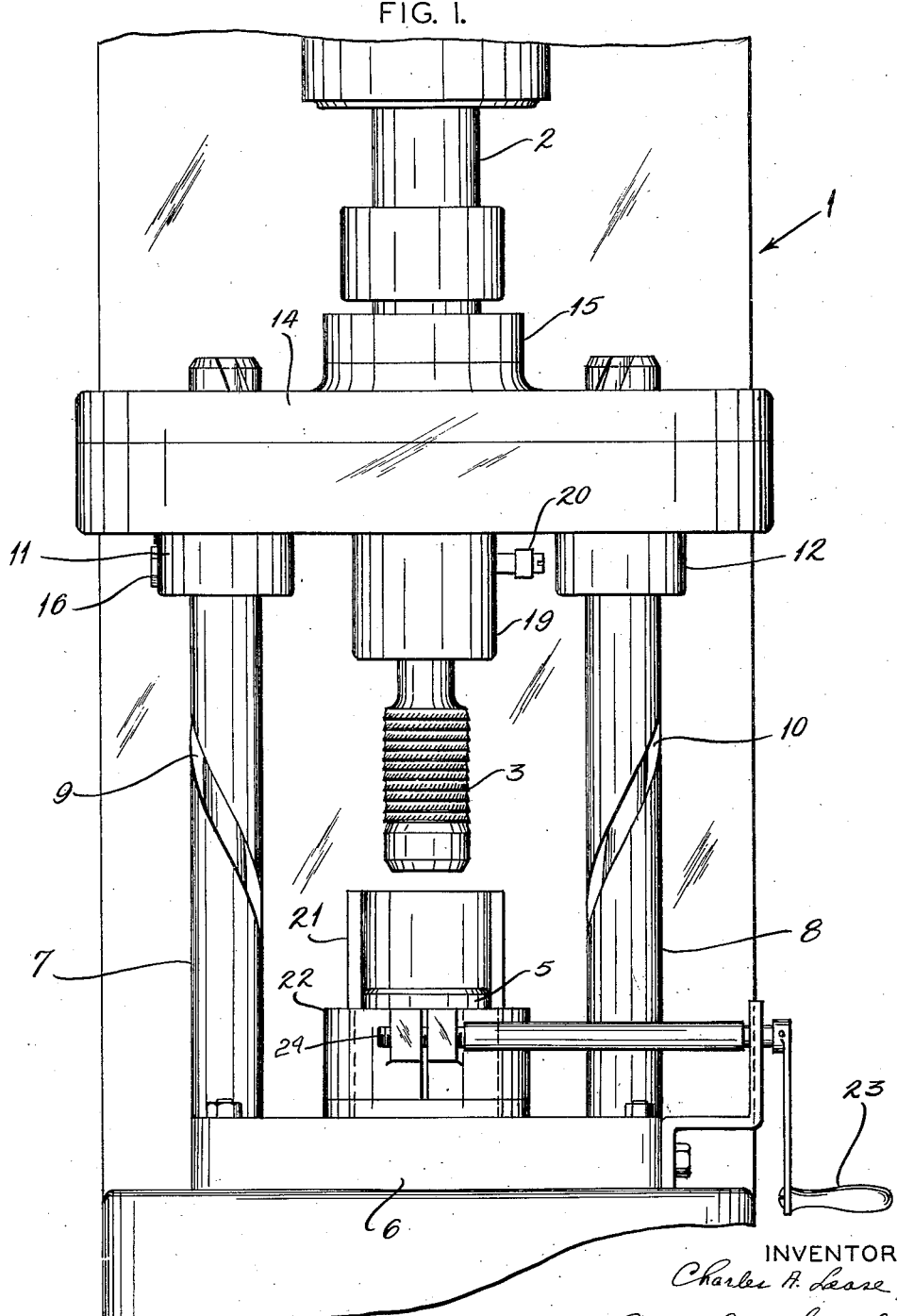
Fig. 1 is an elevational view of a device incorporating the invention.

The invention is embodied in an auxiliary mechanism for a conventional broaching machine generally designated by the numeral 1 provided with a reversibly movable ram 2 preferably operated by suitable hydraulic mechanism for the purpose of vertically moving the broach 3 through a work piece 5 whose interior surface is to be broached, which in the particular instance is a cup for an anti-friction bearing in which the grooves formed therein have a predetermined lead.

The attachment for the broach comprises a bolster plate 6 that is supported on the base of the machine 1 and is suitably secured thereto. Rigidly mounted on the bolster plate 6 are two lead cams 7 and 8 that have oppositely directed cam tracks 9 and 10 formed in each. Each of these cam tracks is specifically shaped so that the broach 3 will be rotated in one direction while it passes through the work piece 5 during one downward stroke, and will be rotated in the opposite direction during the next downward stroke. Rotation is imposed on the broach by means of gear 11 which is slidably received on cam 7 and by gear 12 which is slidably received on cam 8. Gears 11 and 12 mesh with a gear 13 that is coaxially mounted with respect to the broach 3. The gears are rotatably supported in a suitable casing 14 that is provided with a head 15 which receives the ram 2 so that the casing 14 and its associated mechanism may be reciprocated thereby. Each of the gears is machined to have a cam track follower 16 inserted therein. This may be threaded into the collar or hub of one of the gears when a particular direction of rotation is to be applied on the broach and in the other gear when the opposite direction of rotation is to be employed. This cam follower 16 consists of a screw having a roller 17 mounted on the end thereof which fits into the cam tracks. At the completion of each stroke the follower 16 is moved from one gear to the other so that the necessary reverse rotation may be imparted to the broach 3.

The gear 13 is supported on a spindle 18 on whose lower end a head 19 is formed that is provided with a broach releasing mechanism 20. The shank of broach 3 is inserted into this head and is retained therein by suitable well-known detent means. After the downward stroke of the mechanism, as viewed in Figs. 1 and 2, the releasing mechanism 20 is operated by the cam 21 supported on the bolster plate 6 which rotates the mechanism about its pivot point and forces the helical broach out of head 19. The motion of ram 2 is then reversed to place the casing 14 in the Figs. 1 and 2 position whereupon a broach having an oppositely directed helix is inserted into the head 19 and the cam follower mechanism 16 transferred to the other gear. The process is thereupon repeated to broach an oppositely directed spiral cut into the work piece 5. By means of this mechanism the lead of the knurls is controlled and one operating mechanism may then be employed to accomplish two cutting actions in a single work piece.

Figure 2:
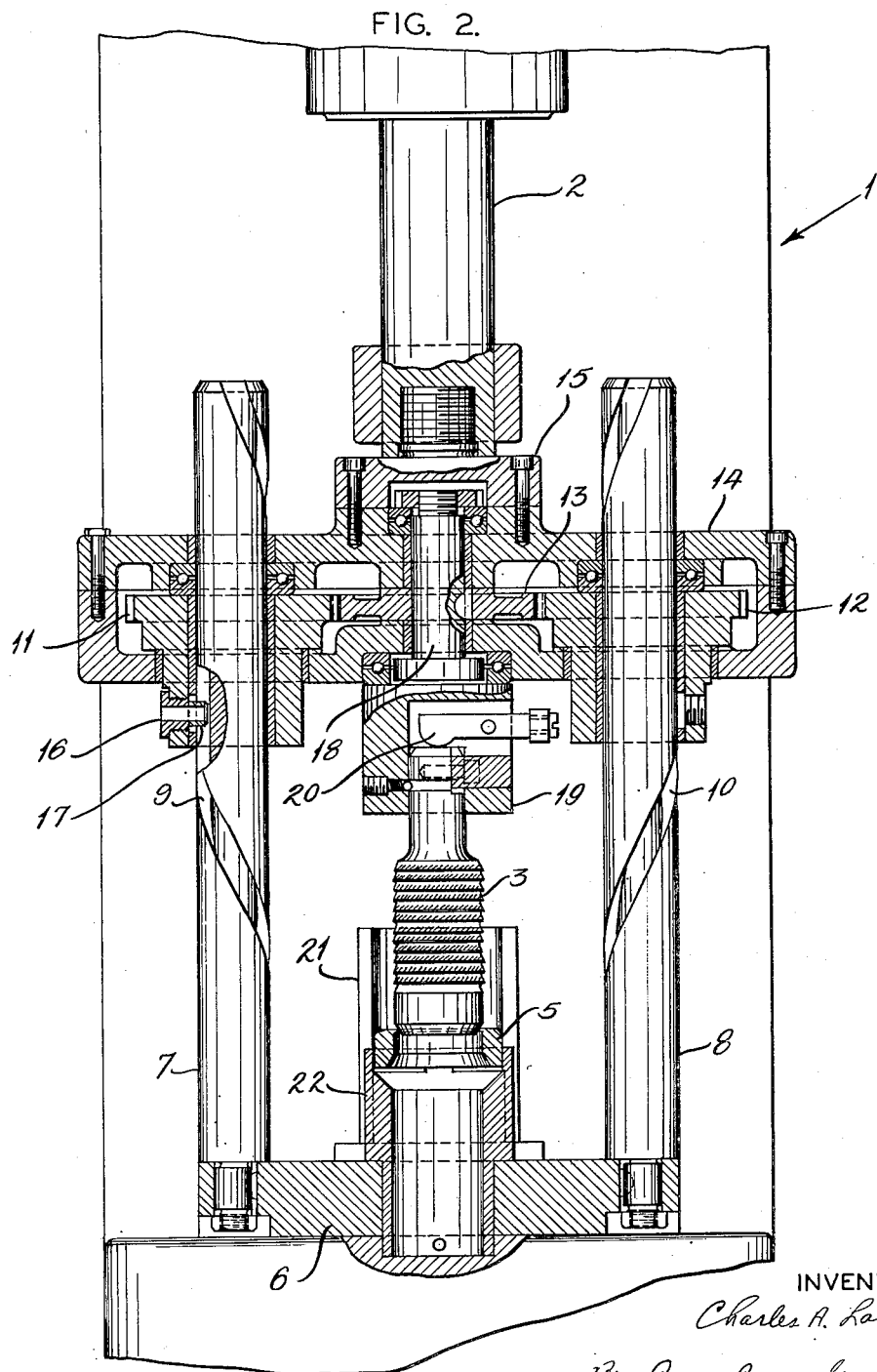
Fig. 2 is a vertical sectional view through the device of Fig. 1, showing operating parts.
Figure 3:
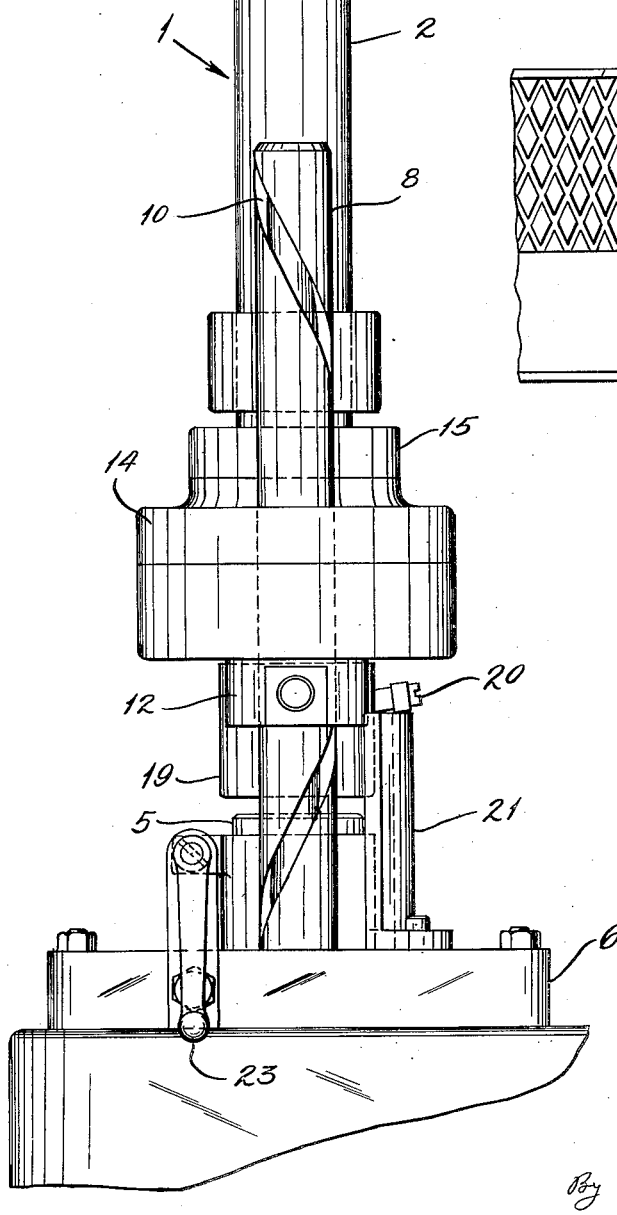
Fig. 3 is an elevational view of the work clamping broach releasing mechanism.
Figure 4:
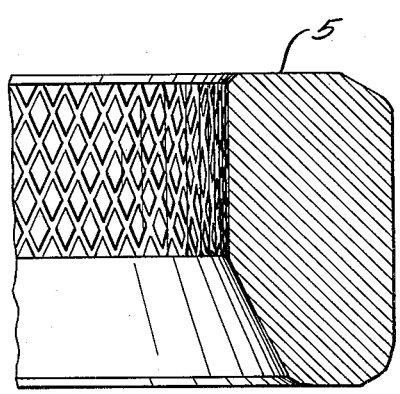
Fig. 4 is a view of a portion of an internally knurled work piece.

The work piece 5 is retained in a work holding mechanism 22 suitably supported on the bolster plate 6 and is preferably a split ring type of clamp which is opened and closed by means of the crank 23 suitably connectable to a clamping and releasing screw 24 shown in Fig. 1 for clamping the work piece in position.

What I claim is:

1. A broaching machine for knurling the interior surface of a tubular article comprising means to hold the article; a broach; means to support said broach; means to impose a reciprocatory movement on said second mentioned means; means to reversely rotate said broach which includes a pair of cams provided with reversely cut cam tracks that are selectively engageable by said broach rotating means; a broach ejecting lever in said broach-support; and means to actuate said lever following each passage of the broach through the article.

2. A broaching machine for knurling the interior surface of a tubular article comprising a broach; means to hold the article to be broached; means to support said broach; means to impose a reciprocatory movement in said support; a pair of cams provided with reversely spiralled cam tracks; a gear mounted on each cam; a gear on said cutter support and meshing with each of said cam mounted gears; means whereby each gear selectively rotates said cutter support; and means to eject said broach from its support after it is passed through said article.

3. A broaching machine for knurling the interior surface of a tubular article comprising a broach; means to hold the article to be broached; means to support said broach; means to impose a reciprocatory movement in said support; a pair of cams provided with reversely helical cam tracks; a gear mounted on each cam; a gear on said cutter support and meshing with each of said cam mounted gears; means whereby each gear selectively rotates said cutter support; a broach ejecting lever pivotally mounted in said support; and means to operate said lever to eject the broach from its support after the broach has passed through the article.

4. A broaching machine for knurling the interior surface of a tubular article comprising means to hold an article to be broached; means to support a broach; means to reciprocate said support; a pair of cams, one provided with a right-handed helical cam track and the other cam provided with a left-handed helical cam track; a gear associated with each cam; a gear associated with said support and meshing with said cam supported gears; means to operatively associate said cam having a left-handed helical track with its gear when a right-handed helical broach is in said support to thereby cut a right-handed helical groove in the article; means to operatively associate said cam having a right-handed helical cam track with its gear when a left-handed helical broach is in said support to thereby cut a left-handed helical groove in the article; and means to eject the broach from said support after passing through the work piece.

CHARLES A. LAASE.

REFERENCES CITED

The following references are of record in the file of this patent:

UNITED STATES PATENTS

| Number | Name | Date |
|---|---|---|
| 1,415,819 | Estep et al. | May 9, 1922 |
| 2,338,989 | Welte | Jan. 11, 1944 |